United States Patent [19]

Issenmann et al.

[11] Patent Number: 5,291,476
[45] Date of Patent: Mar. 1, 1994

[54] SWITCHING CENTER FOR RADIOMOBILE APPLICATION

[75] Inventors: Edouard Issenmann, Le Chesnay; Maurice Martin, Paris, both of France

[73] Assignee: Alcatel CIT, Paris, France

[21] Appl. No.: 422,478

[22] Filed: Oct. 17, 1989

[30] Foreign Application Priority Data

Oct. 21, 1988 [FR] France .................. 88 13826

[51] Int. Cl.⁵ .......................................... H04Q 11/00
[52] U.S. Cl. ...................................... 370/53; 370/68.1; 379/59; 455/33.2
[58] Field of Search ...................... 370/95.1, 53, 94.1, 370/110.1; 379/58, 59, 60; 455/33, 53, 33.1, 33.2, 33.3, 33.4

[56] References Cited

U.S. PATENT DOCUMENTS

| | | | |
|---|---|---|---|
| 4,698,839 | 10/1987 | DeVaney et al. | 379/59 |
| 4,839,888 | 6/1989 | Baltz et al. | 370/68.1 |
| 4,856,048 | 8/1989 | Yamamoto et al. | 455/33.2 |
| 4,912,705 | 3/1990 | Paneth et al. | 370/95.1 |
| 4,955,050 | 9/1990 | Yamauchi | 379/59 |

FOREIGN PATENT DOCUMENTS

WO8502968 7/1985 PCT Int'l Appl. ............ H04Q 7/04

OTHER PUBLICATIONS

Communication & Transmission, No. 2, 1988, pp. 5–14, Sotelec, Paris, France; P. Duplessis et al.: "Pan-European Digital Cellular System For Mobile Telephones".

P. Bocker: "ISDN das diensteintegrierende digitale Nachrichtennetz, Konzept, Verfahren, Systeme", 1986, pp. 141–143 Springer Verlag, Berlin, Germany.

38th IEEE Vehicular Technology Conference "Telecommunications freedom-Technology on the move", Philadelphia, Pa., 15–17, Jun. 1988, pp. 30–37, IEEE, New York, W. Fuhrmann et al.: radio access protocol of the new GSM land mobile communication standard, p. 30,S3,p. 32, S4.2.

International Switching Symposium 1987, Phoenix, Ariz., 15–20 Jun. 1987, pp. 734–738, IEE, New York; B. Ghillebaert: "the second generation cellular system".

IEEE Communications Magazine, vol. 25, No. 6, Jun. 1987, pp. 22–30, IEEE New York; E. S. K. Chien et al.: "Cellular Access Digital Networks of the future", pp. 22–25, left column-line 17.

Primary Examiner—Douglas W. Olms
Assistant Examiner—Shick Hom
Attorney, Agent, or Firm—Sughrue, Mion, Zinn, Macpeak & Seas

[57] ABSTRACT

A switching center of the invention includes a service access exchange and a control point which are interconnected by an interconnection multiplex link. The exchange is connected to base station controllers via first multiplex links and to the public switched telephone network by second multiplex links which also convey signalling relating to a permanent file, relating to a temporary file, and relating to other switching centers. The exchange sets up semipermanent links between the interconnection multiplex link connecting it to the control point and both the first multiplex links for the purpose of interchanging signalling, and to the second multiplex links for interchanging signalling with the permanent and temporary files and with other switching centers.

8 Claims, 4 Drawing Sheets

SWITCHING CENTER FOR RADIOMOBILE APPLICATION

BACKGROUND OF THE INVENTION

1. Field of the Invention

The invention relates to connecting mobile subscribers in a cellular radiotelephone network to the public switched telephone network.

2. Description of the Related Art

An article by G. Söderholm, J. Widmark, and E. Ornulf entitled "Ericsson Cellular Mobile Telephone Systems" published in Ericsson Review, No. B 1987, pp. 42 to 49, describes a connection system for mobile subscribers in which radio links are provided by allocating a frequency to a subscriber for the duration of a call.

In this system, function specific both to managing the mobile subscribers and to telephone switching (voice and data) are integrated in the same unit.

An article by P. Duplessis and F. Maillard, entitled "Le systéme cellulaire numérique paneuropéén de radiotéléphonie avec les mobiles" (the Pan-Eueropean Digital Cellular System for Radiotelephony with Mobiles) published in Commutation et Transmission, No. 2, 1988, pp. 5 to 14, describes a mobile subscriber connection system in which radio links are provided using the time division multiple access (DTMA) method. In this system, management functions relating to the mobility of mobile subscribers and functions specific to communication are processed in the same unit.

In both of these systems, the same exchange handles both switching functions ad processing functions specific to the mobility of the subscribers. This integration suffers from several drawbacks:

it requires special exchanges to be used;

the exchange requires very considerable processing capacity which is highly sensitive to subscriber mobility and to the topology of the cellular network;

the processing power required for signalling is very largely related to aspects of subscriber mobility, without any bearing on switching functions; and two applications are mixed up in a single physical system which gives rise to difficulties in the management, maintenance, and updating of each of the applications.

The object of the invention is to avoid the drawbacks of known systems.

SUMMARY OF THE INVENTION

The invention provides a switching center for radiomobile application, for connecting mobile subscribers to a public switched telephone network, said switching center being connected via first multiplex links to controllers which are themselves connected to base stations in radio communication with mobile subscribers, and via second multiplex links to the telephone network, said first multiplex links conveying speech signals, data, and associated signalling, said second multiplex links transferring the speech signals, data, and signalling including signalling relating to switching operations and signalling relating to a permanent file of mobile subscribers, relating to a temporary file of mobile subscribers present in a geographical zone, and relating to other switching centers in the geographical zone, the signalling of the first and second multiplex links being conveyed using the CCITT No. 7 signalling system, and said switching center providing switching functions and signalling functions related to the radiomobile application, wherein the switching center comprises a service access exchange and a radiomobile control point interconnected by an interconnecting multiplex link, and wherein the service access exchange establishes semipermanent links between the interconnecting multiplex link and the first multiplex link for interchanging signalling, semipermanent links between the multiplex link and the second multiplex links for interchanging signalling relating to the files and to the other switching counters, and a permanent link between the interconnecting multiplex link and a signalling point of the service access exchange, the signalling point being also connected via permanent links to the second multiplex links for interchanging signalling relating to switching operations, the service access exchange providing switching functions only, and the radiomobile control point providing signalling functions for the radiomobile application only.

The switching center of the invention has several advantages:

it makes it possible to use exchanges of the same type as those used in the public switched telephone network;

by separating the switching application from the radiomobile application it makes it possible for each application to be updated independently;

the switching power remains the same as that of a conventional exchange;

the processing power needed by the exchange for signalling remains limited to switching functions;

it makes total separation possible between switching per se and radiomobile maintenance and operating functions;

an appreciable advantage is that it makes it possible to make direct use of an exchange in the public switched telephone network by connecting the exchange directly to base station controllers and by connecting it to a radiomobile control point;

it also makes it possible to use a radiomobile control point which is common to several exchanges, even if the exchanges are of different types, e.g. Alcatel E10 and S12 types; and it offers the advantage of a single development cost for the radiomobile application regardless of the type of exchange used.

BRIEF DESCRIPTION OF THE DRAWINGS

An embodiment of the invention is described by way of example with reference to the accompanying drawings, in which.

DETAILED DESCRIPTION OF THE PREFERRED EMBODIMENTS

In general, the cellular radiotelephone network is connected to the public switched telephone network PSTN. The radiotelephone network comprises a radio subsystem RSS and a network subsystem NSS connected to or under the radio subsystem RSS and also connected to the public switched telephone network PSTN.

Figure 1:
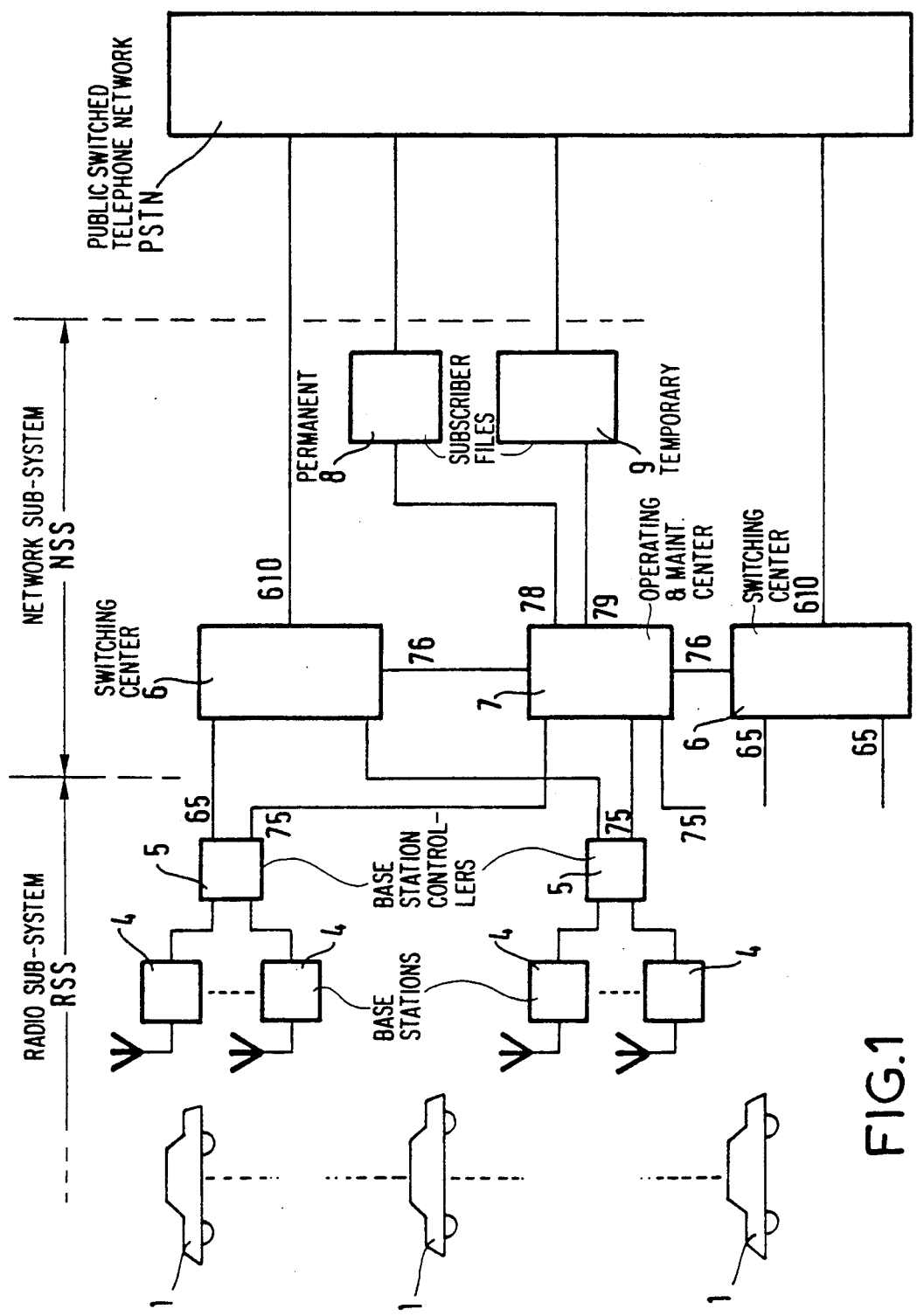
FIG. 1 is a diagram showing the architecture of a portion of a cellular radiotelephone network.

FIG. 1 is a block digram of a portion of a cellular radiotelephone network connected to the public switched telephone network PSTN.

The radio subsystem RSS comprises mobile subscribers 1, base stations 4 in radiotelephone communication with mobile subscribers, the base stations comprising radio transmission and reception equipment, and base station controllers 5 each connected to the base stations 4 that may be distant from or integrated with the controller 5. The connectors between a controller 5 and the base stations 4 are pulse code modulation (PCM) multiplex links as standardized by the CEPT (the European Conference of postal and Telecommunications Administrations). The controllers 5 provide digital concentration foe the network subsystem NSS to which they are connected via PCM multiplex links and CEPT standardized interfaces referred to as "A interfaces", the multiplex links conveying speech signals, data, and signalling using the CCITT No. 7 signalling system which is a semaphore channel signalling system defined by he CCITT for digital networks and transmission.

The network subsystem NSS comprises one or more switching centers 6 each providing an interface between the radio subsystem RSS and the telephone network PSTN, a permanent file 8 of mobile subscribers of the cellular radiotelephone network, and a temporary file 9 of mobile subscribers present in the zone served by the switching centers 6 and the base stations 4 of that portion of the radiotelephone network which is shown in FIG. 1, which portion may correspond, for example, to a geographical zone. The network subsystem NSS shown in FIG. 1 also includes an operating and maintenance center 7 that forms a part of the radiotelephone network. This operating and maintenance center 7 is connected to each of the switching centers 6 in the portion of the radiotelephone network shown in FIG. 1. However, if a portion of the radiotelephone network contains only on switching center, that switching center may be connected to an operating and maintenance center belonging to a different portion of the radiotelephone network.

A switching center 6 is connected via first multiplex links 65 to the controllers 5, the multiplex links 65 conveying speech signals, data, and signalling. The switching center 6 is connected via second multiplex links 610 to the public switched telephone network PSTN, with the second multiplex links conveying speech signals, data, and signalling.

Figure 2:
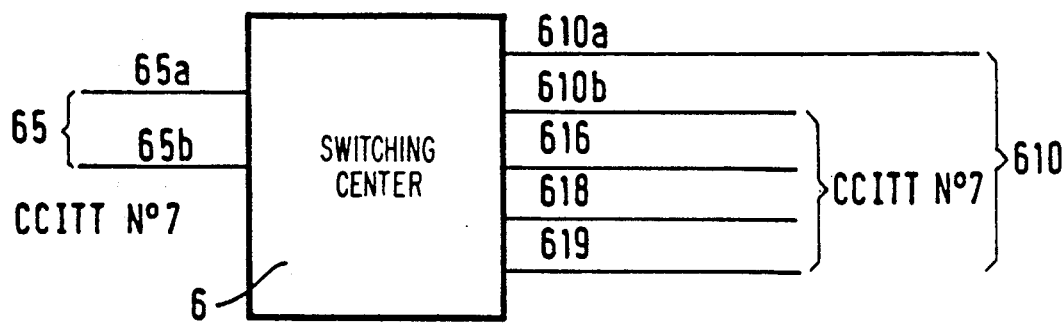
FIG. 2 shows the logical connections of a switching center as shown in FIG. 1.

The public switched telephone network PSTN has transfer points for CCITT No. 7 signalling which are used by the radiomobile application for links 616, 618, and 619 of FIG. 2. Both a permanent file 8 of mobile subscribers and a temporary file 9 of these mobile subscribers which are present in the geographical zone of the switching center 6 of the portion of the radiotelephone network shown in FIG. 1 are connected to the switching centers 6 over the public switched telephone network PSTN with information being exchanged via the semaphore channels. An operating and maintenance center 7 for the switching centers 6 is connected to the switching centers 6 over links 76 and to the permanent and temporary files over links 78 and 79, respectively.

FIG. 2 shows the logical connections of the links interconnecting the switching center 6 of FIG. 1 with the controllers 5 and the public switched telephone network PSTN. A first multiplex link 65 comprises a logical speech and data connection 65a and a logical signalling connection 65b. The second multiplex links 610 comprise logical connections 610a for transmitting speech and data, logical signalling connections 610b for signalling relating to the logical connections 610a, logical connections for inter-center signalling 616 for interconnecting the switching center 6 with the other switching centers 6 of FIG. 1 in order to exchange information, a logical connection for permanent file signalling 618, and a logical connection for temporary file signalling 619 giving access to the files. Both the logical connection for signalling 65b and the logical connections 610g, 616, 618, and 619 are semaphore channels of the multiplex links 65 and 610. The logical connections 65a and 610a are channels of the multiplex links 65 and 610, other than the semaphore channels, and as already mentioned, the logical connections for signalling all make use of the CCITT No. 7 signalling system.

Naturally, the signalling conveyed by logical signalling connections 610b could be signalling as used to the public switched telephone network PSTN, e.g. multifrequency signalling.

Figure 3:
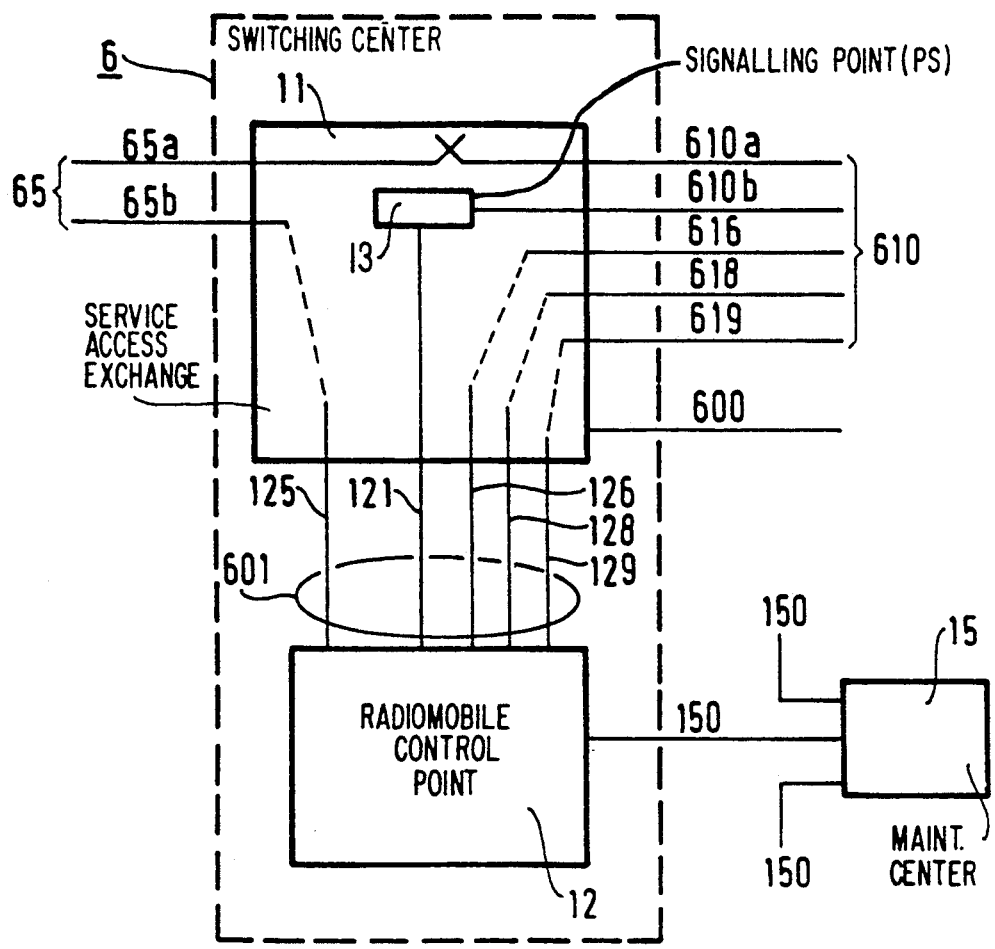
FIG. 3 is a digram of a switching center of the invention.

FIG. 3 is a digram of a switching center 6 of the invention including a service access exchange 11 and a radiomobile control point 12.

The service access exchange 11 is an exchange of the same type as used in current telephone network, e.g. an alcatel type E10 of S12 exchange. It is connected o the controllers 5 via the first multiplex links 65 and to the public switched telephone network PSTN via the second multiplex links 610. In FIG. 3, the multiplex links 65 and 610 are shown, as in FIG. 2, as comprising pluralities of logical connections 65a & 65b, and 610a, 610b, 616, 618, & 619. In addition, the service access exchange 11 is connected via a link 600 to an operating and maintenance center of the public switched telephone network PSTN.

The service access exchange 11 switches speech signals and data in both directions between the logical connections 65a and 610a, i.e. between the channels of multiplex links 65 and 610, and it conveys signalling between the radiomobile control point 12 a the signalling logical connections 65a via semipermanent links.

The service access exchange 11 has a signalling point (PS) 13 at which it processes all of the signalling conveyed via signalling logical connection 610b in both call directions. It conveys signalling between the radiomobile control point 12 and the signalling logical connections 616, 618, and 169 via semipermanent links, the signalling being transmitted or received by the radiomobile control point 12.

The radiomobile point 12 thus processes all of the signalling relating to the radiomobile application, with the service access exchange 11 processing only the signalling which is associated with the speech and data channels of logical connection 610a. The signalling point (PS) 13 of the service access exchange 11 is connected via a permanent link to the radiomobile control point 1.

In FIG. 3, the radiomobile control point 12 and the service access exchange 11 are interconnected by a multiplex link 610 comprising logical connections 125, 121, 126, 128, and 129 respectively connected to logical connection 65b, to signalling point (PS) 13, an to logical connections 616, 168, and 619.

The radiomobile control point 12 is also connected to a radiomobile operating and maintenance center 15 via a link 150. The radiomobile operating and maintenance center 15 is attributed to a geographical zone of the radiomobile network, it is therefore connected to the radiomobile control points 12 of the switching centers 6 in that zone. If a geographical zone has only one switching center, then its radiomobile control point 12 is connected to the radiomobile operating and maintenance center of a neighboring geographical zone.

The service access exchange 11 performs the following functions:

it contributes a signalling point in the public switched telephone network PSTN to which it si connected via signalling logical connection 610b;

it performs level 1 routing of semipermanent links between the radiomobile control point 12 and logical connections 65b, 616, 618, and 619, i.e. The semaphore channels of the first multiplex links 65 and of the second multiplex links;

it provides an intelligent network type of interface with the radiomobile control point 12 for interchanging information via logical connection 121 of multiplex link 601;

it responds to instruction issued by the radiomobile control point 12 over logical connection 121 for performing transfer operations during a call;

it performs al conventional switching functions; (it should be observed that the price access exchange 11 does to process signalling coming from or going to logical connections 65b, 616, 618, and 619, but that it merely establishes semipermanent links between these logical connections and the radiomobile control point 12); and it processes operating instructions bearing on the operation of the public switched telephone network PSTN and transmitted by the operating and maintenance center of the network to which it is connected via link 600.

The radiomobile control point 12 performs the following functions:

it interfaces and processes all of the radiomobile application signalling of the radiomobile subsystem RSS and of the network subsystem NSS;

it performs all functions related to subscriber mobility;

it acts as a national No. 7 signalling point for the radiomobile application of the network subsystem NSS;

it acts as a local No. 7 signalling point for the radiomobile application of the radiomobile subsystem RSS;

it controls the service access exchange 11 in relationship to its subscriber mobility functions;

it updates the temporary file 9 relating to mobile subscribers present in the geographical zone served by one or more switching centers;

it supervises and sets up calls and associated services;

it performs call charging;

it monitors the radiomobile application; and it operates the radiomobile application in communication with the operating and maintenance center of the radiomobile application 15 to which it is connected, this function being independent of the equivalent function of the public switched telephone network PSTN.

Two embodiments of the national subsystem NSS are made possible by the structure of a switching center 6 of the invention as shown in FIG. 3.

In the first embodiment, each switching center 6 is contributed by a service access exchange 11 and by a radiomobile control point 12.

Figure 4:
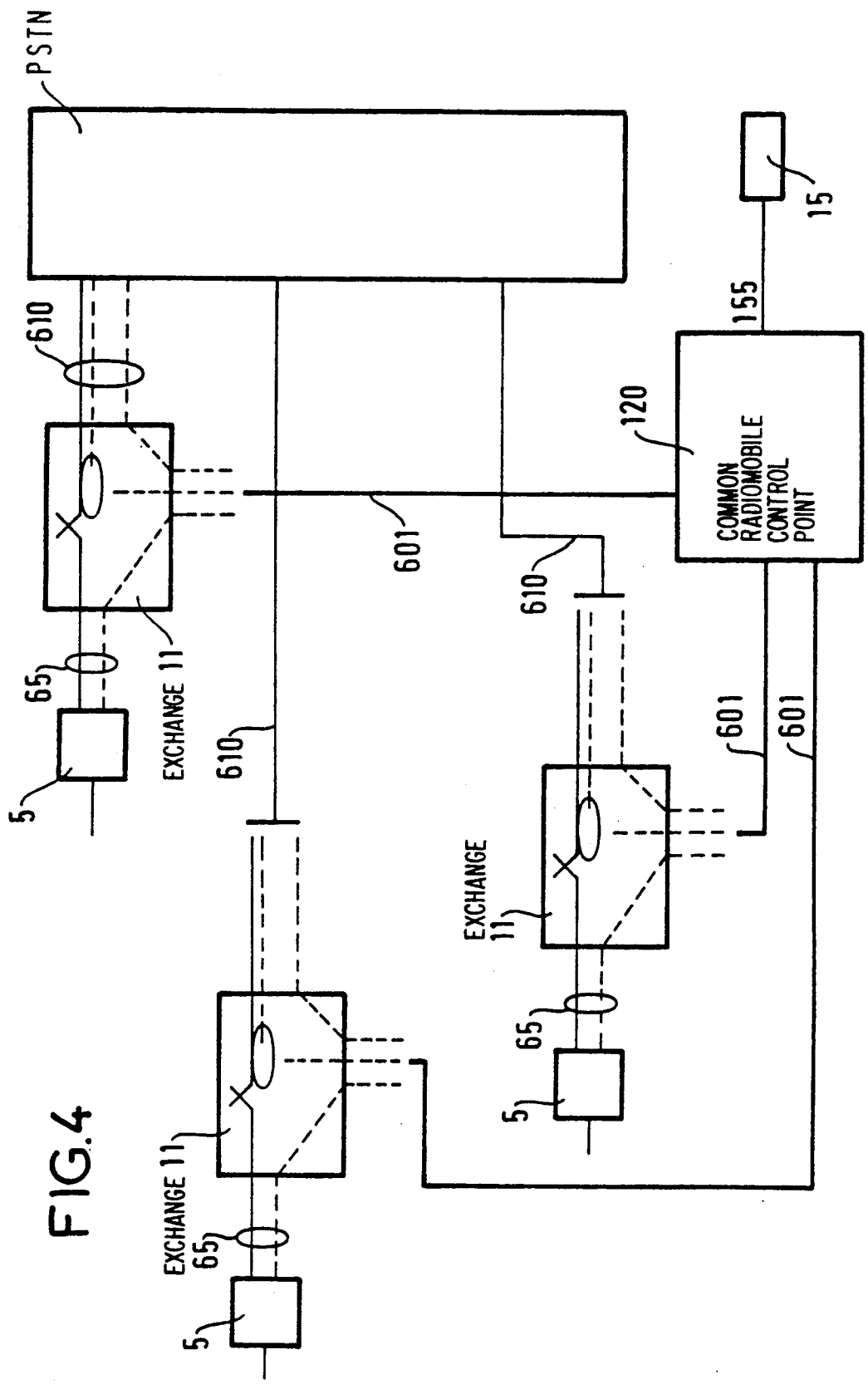
FIG. 4 shows a variant embodiment of the switching center shown in FIG. 3.

In a second embodiment, shown in FIG. 4, each switching center includes a service access exchange 11, and the radiomobile control points of several switching centers are combined in a common control point 120 which is connected via links 601 to each of the service access exchanges 1, and via a link 155 to a radiomobile operating and maintenance center 15.

This second embodiment is made possible by the structure of the switching center of the invention in which the function of switching and of radiomobile application signaling are separated and performed by two distinct units.

The structure of a switching center of the invention makes it possible for the service access exchange 11 to be of the same type as exchanges used in public switched telephone networks PSTN.

In FIG. 1, which shows a portion of a radiotelephone network, the switching centers 6 do not form a part of a public switched telephone network PSTN but are connected to exchanges of the public telephone network, since it as been conventional in the past to use specialized radiomobile switching centers.

Figure 5:
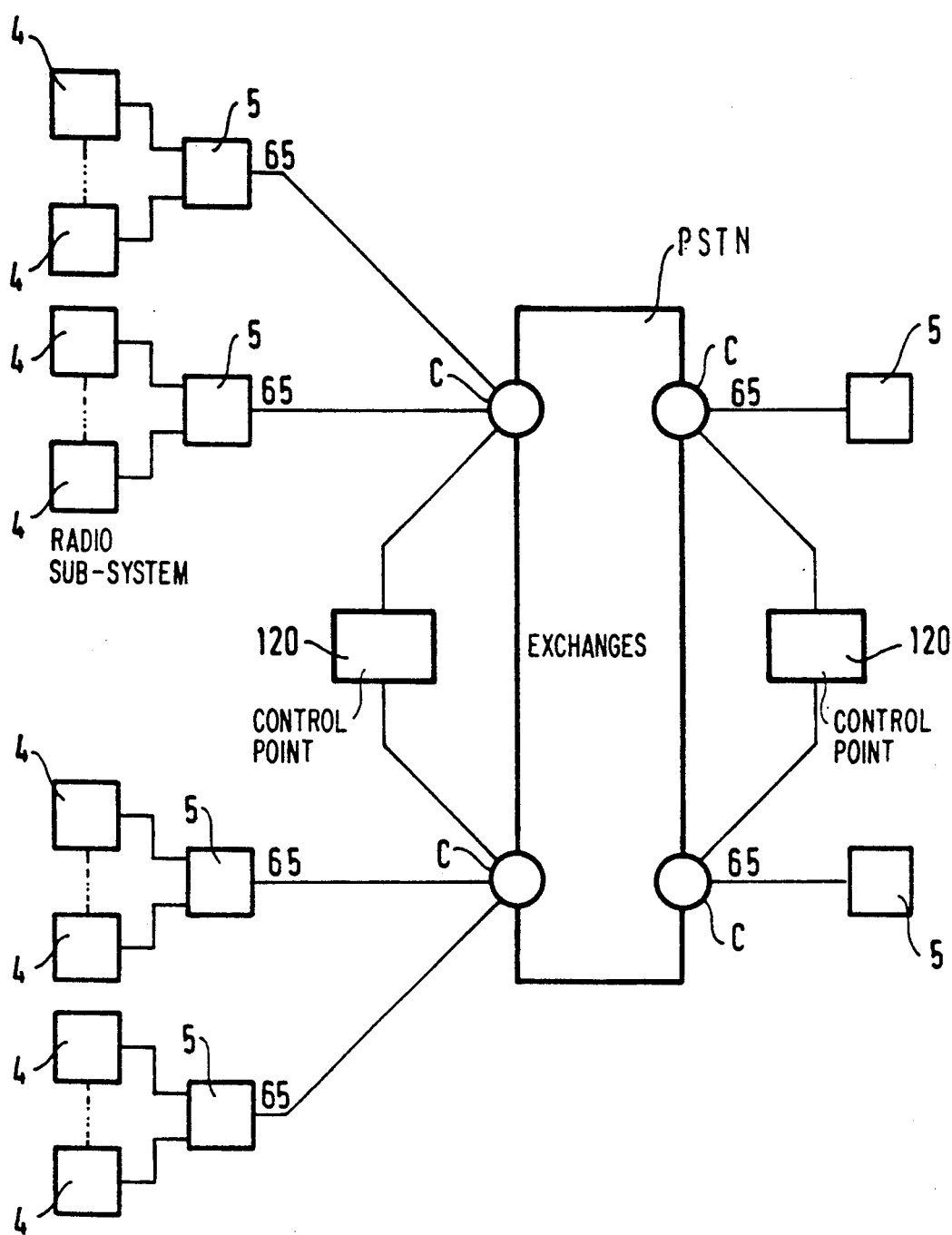
FIG. 5 shows the use of an exchange in the telephone network to perform the switching of a switching center.

However, as shown in FIG. 5, the structure of a switching center of the invention makes it possible to use exchanges C of the telephone network as switching centers for radiomobile application. The exchanges C are then directly connected to the controllers 5 of the base stations 4. They are also connected to a common radiomobile point 120, with the control point 120 being common to a plurality of exchanges situated in the same geographical zone. Naturally, a control point could be connected to one exchange C only.

The invention thus makes it possible to eliminate switching centers for radiotelephone networks, at least in most cases. There may also be occasions, for special reasons of geographical coverage, when switching centers will be used which are connected to the telephone network in the manner that is now used to radiotelephone networks.

We claim:

1. A switching center for radiomobile application, for connecting mobile subscribers to a public switched telephone network, said switching center being connected via first multiplex links to controllers which are themselves connected to a base stations in radio communication with mobile subscribers, and via second multiplex links to the public switched telephone network, said first multiplex links conveying speech signals, data, and associated signalling, said second multiplex links transferring the speech signals, data, and signalling including signalling relating to switching operations and signalling relating to a permanent file of mobile subscribers, relating to a temporary file of mobile subscribers present in a geographical zone, and relating to other switching centers in the geographical zone, the signalling of the first and second multiplex inks being conveyed using the CCITT No. 7 signalling system, and said switching center providing switching functions and signalling functions related to the radiomobile application, wherein said switching center comprises a service access exchange and a radiomobile control point interconnected by an interconnecting multiplex link, and wherein said service access exchange establishes semipermanent links between the interconnecting multiplex link and the first multiplex link for interchanging signalling, semipermanent links between the interconnecting multiplex link and the second multiplex links for interchanging signalling relating to the files and to the other switching centers, and a permanent link between the interconnecting multiplex link and signalling point of said service access exchange, said signalling point being also connected via permanent links to the second multiplex links for interchanging signalling relating to switching operations, said service access exchange providing switching functions only, and said radiomobile control point providing signalling functions for the radiomobile application only.

2. A switching center according to claim 1, wherein said service access exchange is an exchange in the public switched telephone network.

3. A switching center according to claim 1, wherein said service access exchange is connected to an operating and maintenance center of said public switched telephone network and that the radiomobile control point is connected to a radiomobile operating and maintenance center of the radiotelephone network, said radiomobile operating and maintenance center being also connected to the controllers of the base stations and to the permanent and temporary files.

4. A switching center according to claim 1, wherein said radiomobile control point is common to a plurality of service access exchanges.

5. A switching center according to claim 1, wherein said radiomobile control point is positioned at a position remote from said service access exchange.

6. A switching center for a radiomobile application which connects mobile subscribers to a public switched telephone network, said switching center comprising:
   a radiomobile control point for providing signalling functions concerning only mobility of the mobile subscribers; and
   a service access exchange for providing signalling functions concerning only switching of communications and for switching the communication, wherein said switching center is connected via first multiplex links to controllers which are themselves connected to base stations and via second multiplex links to the public switched telephone network, wherein said first multiplex links convey speech signals, data, and associated signalling, and said second multiplex links transfer the speech signals, data, and signalling including signalling relating to switching operations and signalling relating to a permanent file or mobile subscribers, relating to a temporary file of mobile subscribers presenting a geographical zone, and relating to other switching centers in the geographical zone.

7. A switching center for a radiomobile application which connects mobile subscribers to a public switched telephone network, said switching center comprising:
   a radiomobile control point for providing signalling functions concerning only mobility of the mobile subscribers; and
   a service access exchange for providing signaling functions concerning only switching of communications and for switching the communication, wherein said switching center is connected via first multiplex links to controllers which are themselves connected to base stations and via second multiplex links to the public switched telephone network, wherein said service access exchange establishes semipermanent links between said interconnecting multiplex link and said first multiplex link for interchanging signalling, semipermanent links between said interconnecting multiplex link and said second multiplex links for interchanging signalling relating to at least one of the temporary and permanent files and to the other switching centers, and a permanent link between said interconnecting multiplex link and a signalling point of said service access exchange, said signalling point being also connected via permanent links to said second multiplex links for interchanging signalling relating to switching operations.

8. A switching center for a radiomobile application which connects mobile subscribers to a public switched telephone network, said switching center comprising:
   a radiomobile control point for providing signalling functions concerning only mobility of the mobile subscribers; and
   a service access ex change for providing signalling functions concerningly only switching of communications and for switching the communication,
   wherein said switching center resides in a radiotelephone network, and
   wherein the service access exchange is connected to an operating and maintenance center of the public switched telephone network and that said radiomobile control point is connected to a radiomobile operating and maintenance center of the radiotelephone network.

* * * * *